US012515304B2

(12) United States Patent
Liang et al.

(10) Patent No.: US 12,515,304 B2
(45) Date of Patent: Jan. 6, 2026

(54) RETURN TRANSMISSION OF NAILING ROD FOR ELECTRIC NAIL GUN

(71) Applicant: DE POAN PNEUMATIC CORP., New Taipei (TW)

(72) Inventors: Chia-Sheng Liang, New Taipei (TW); I-Tsung Wu, New Taipei (TW); Ying-Chieh Liu, New Taipei (TW); Yu-Che Lin, New Taipei (TW)

(73) Assignee: DE POAN PNEUMATIC CORP., New Taipei (TW)

( * ) Notice: Subject to any disclaimer, the term of this patent is extended or adjusted under 35 U.S.C. 154(b) by 96 days.

(21) Appl. No.: 18/624,369

(22) Filed: Apr. 2, 2024

(65) Prior Publication Data

US 2024/0335930 A1 Oct. 10, 2024

(30) Foreign Application Priority Data

Mar. 18, 2024 (TW) ................................. 113109981

(51) Int. Cl.
*B25C 1/06* (2006.01)

(52) U.S. Cl.
CPC ...................................... *B25C 1/06* (2013.01)

(58) Field of Classification Search
CPC .. B25C 1/06; B25C 1/008; B25C 1/04; B25C 5/10; B25D 11/00
See application file for complete search history.

(56) References Cited

U.S. PATENT DOCUMENTS

| | | | | |
|---|---|---|---|---|
| 7,575,141 | B1 | 8/2009 | Liang et al. | |
| 7,575,142 | B2 | 8/2009 | Liang et al. | |
| 8,991,675 | B2 | 3/2015 | Liang et al. | |
| 10,919,136 | B2 | 2/2021 | Akiba | |
| 2013/0153254 | A1 * | 6/2013 | Liang ..................... | B25D 11/00 173/114 |

* cited by examiner

*Primary Examiner* — Veronica Martin
(74) *Attorney, Agent, or Firm* — Chun-Ming Shih; HDLS IPR SERVICES

(57) ABSTRACT

A return transmission of nailing rod for electric nail gun is disclosed, comprising a pulley assembly and a return elastic component configured in a gun body frame. The pulley assembly includes a towing rope, a movable pulley that guides the towing rope. A guiding holder is provided for pivoting the movable pulley. When the nailing rod moves downward along a nailing stroke to shoot the nail, the towing rope can tow the movable pulley and drive the guiding holder to move an action stroke in a way to store the elastic potential energy of the return elastic component. After nailing, the return elastic component will drive the guiding holder in a way to release the elastic potential energy, so that the guiding holder can move along the action stroke back to its original position, and the guiding holder will tow the towing rope through the movable pulley, so as to drive the nailing rod to move along the nailing stroke back to its original position. In this way, the load of the return elastic component can be reduced.

14 Claims, 11 Drawing Sheets

RETURN TRANSMISSION OF NAILING ROD FOR ELECTRIC NAIL GUN

BACKGROUND OF INVENTION

1. Field of the Invention

The present invention relates generally to a transmission structure for electric nail gun, and more particularly to a nailing rod return transmission for electric nail gun.

2. Description of Related Art

Most conventional electric nail guns rely on the built-in driving units such as motor, electromagnetic driver, and flywheel to drive the nailing rod to execute a nailing action by moving the nailing rod downward for a nailing stroke, and rely on a coil extension spring or a rubber string to execute an upward returning movement after nailing by moving the nailing rod upward for the nailing stroke. Specifically, the distance of the nailing stroke is preset by the designing end and cannot be adjusted. The present invention specifically addresses the upward returning technique after the nailing rod has moved downward for a specific nailing stroke to execute the nailing action.

Contents of similar techniques are disclosed in such patents as U.S. Pat. Nos. 7,575,141B1, 7,575,142B2, 8,991,675B2, and 10,919,136B2. Their respective features are as follow:

U.S. Pat. No. 7,575,141B1 discloses a pair of coil compression springs configured on both sides of the nailing rod in the nailing axial direction, which can be compressed during the downward movement of the nailing rod under the drive of the nailing rod, so as to store an elastic potential energy. Thus, after the nailing rod has moved downward to shoot the nail, the elastic potential energy can drive the nailing rod to move upward quickly back to its original position.

Different from the aforesaid U.S. Pat. No. 7,575,141B1, in U.S. Pat. No. 7,575,142B2, a pair of coil extension springs is wound through a pin roller (also called fixed pulley), for the purpose of reducing the length of the pair of coil extension springs configured in the nailing axial direction.

U.S. Pat. No. 8,991,675B2 abandons the use of coil compression spring and coil extension spring used in the aforesaid U.S. Pat. Nos. 7,575,141B1 and 7,575,142B2 to drive the nailing rod to move upward to reset. Instead, it adopts a pair of rubber strings to drive the nailing rod to move upward to reset.

Furthermore, U.S. Pat. No. 10,919,136B2 is different from all of the above techniques, and discloses the use of a torque spring to drive the nailing rod to move upward to reset.

As we can see, the elastic components used in the existing electric nail guns for driving the nailing rod to move upward to reset are mostly made of metal springs (including coil extension spring, coil compression spring, and torque spring) or rubber strings. Also, the aforesaid springs or rubber strings used to drive the nailing rod to reset must be driven by the nailing rod during the downward movement (being extended or compressed) to store an elastic potential energy within an action distance, and then based on the action distance, the elastic potential energy can be released to drive the nailing rod to move upward to reset.

The metal springs disclosed in the aforesaid U.S. Pat. Nos. 7,575,141B1, 7,575,142B2, and 10,919,136B2 may easily become brittle after long-term impact. Moreover, the action distances of the springs driven by nailing rod to store an elastic potential energy are all equal to the nailing stroke. The longer the nailing stroke is, the longer the action distance of the springs (also called extension or compression distance) will be, and the more likely the springs will become brittle.

The rubber string disclosed in U.S. Pat. No. 8,991,675B2 can avoid the problem of the springs to become brittle after long-term impact. However, the elastic force generated by the rubber string is far less than springs. Moreover, when the action distance of the rubber string driven to store an elastic potential energy is “equal” to the nailing stroke, particularly after prolonged operation, the rubber string is also subject to fatigue to cause reduced service life.

SUMMARY OF THE INVENTION

To practically solve the technical problems of the aforesaid prior-art techniques, the inventor of the present invention believes that a solution should be found to reduce the action distance of the elastic component (defined as return elastic component in the present invention) used to store an elastic potential energy to drive the nailing rod to reset. In other words, under the condition that the elastic potential energy stored by the return elastic component is sufficient for driving the nailing rod to move upward to reset, the action distance of the return elastic component should be reduced, i.e., the action distance should be greater than 0 and less than the nailing stroke (i.e. distance), so as to avoid impact brittleness of the spring or elastic fatigue of the rubber string after long-term use.

The present invention adopts a configuration means based on the dependent transmission technique of a pulley assembly, so as to reduce the action distance of the return elastic component, and to enhance the resistance of the return elastic component and related transmission structures to fatigue as well as their service life.

Therefore, a preferred embodiment of the present invention is to provide a return transmission of nailing rod for electric nail gun, which is configured on a gun body frame and comprises: a motor driving unit, a nailing rod, a pulley assembly, and at least one return elastic component. Features of the return transmission are as follow:

The nailing rod is fixed inside the gun body frame along a nailing axial direction in a slidable manner, the nailing rod is driven by the motor driving unit to move downward along a nailing stroke in the nailing axial direction to shoot the nail.

The pulley assembly comprises at least one movable pulley, a guiding holder, and at least one towing rope. The at least one movable pulley is pivoted inside the guiding holder in a freely rotatable manner. The guiding holder carries the at least one movable pulley and can move in the nailing axial direction. The at least one towing rope has a head end and a tail end forming a specific length in between. The head end is fixed on the nailing rod and the tail end is fixed on the gun body frame. The at least one movable pulley is positioned between the head end and the tail end to guide the at least one towing rope.

The at least one return elastic component is configured between the gun body frame and the guiding holder to drive the guiding holder configured in a movable manner.

When the nailing rod moves downward along the nailing stroke to shoot the nail, the at least one towing rope tows the at least one movable pulley and drives the guiding holder, so that the guiding holder can move an action stroke in a way to store the elastic potential energy of the at least one return elastic component. After the nailing rod moves downward to shoot the nail, the at least one return elastic component will drive the guiding holder in a way to release the elastic potential energy, so as to move it by following the action stroke back to its original position, and through the at least one movable pulley, the guiding holder tows the at least one towing rope so as to drive the nailing rod to move upward along the nailing stroke to reset. The action stroke is greater than 0 and less than the nailing stroke.

In further implementation, the movable pulley in the pulley assembly is connected between the nailing rod and the gun body frame for transmission, in a way to move dependently, and a non-elastic cable is used as the towing rope. Thus, the action stroke is greater than 0 and equal to half of the nailing stroke.

Furthermore, an elastic rubber string can be used to replace the aforesaid cable as the towing rope, and it is defined that the elastic force provided by the at least one towing rope is less than the elastic force provided by the at least one return elastic component, so that, during the nailing process, the at least one elastic towing rope can assist the return elastic component in providing elastic force, and the action stroke of the return elastic component can be reduced to be less than half of the nailing stroke. Thus, the return elastic component can have greatly enhanced resistance to fatigue and longer service life. In further implementation, the pulley assembly also comprises at least one fixed pulley fixed on the gun body frame in a freely rotatable manner, the at least one fixed pulley is positioned between the head end and the guiding holder to guide the at least one towing rope. The at least one movable pulley is configured beside the nailing rod in the nailing axial direction in a movable manner. The nailing rod has a striking part, and the at least one movable pulley is positioned between the at least one fixed pulley and the striking part in the nailing axial direction. Specifically, the at least one fixed pulley is positioned on the gun body frame above the nailing rod in the nailing axial direction.

In further implementation, the gun body frame is also configured with at least one guide column in the nailing axial direction, and the guiding holder is configured on the at least one guide column in a slidable manner for movement within the action stroke. Specifically, the at least one guide column is configured in a pair, the pair of guide columns respectively have a top end and a bottom end that can be fixed with the gun body frame, the at least one return elastic component is configured in a pair, the pair of return elastic component are symmetrically positioned between the guiding holder and the bottom end, or are symmetrically positioned between the top end and the guiding holder.

In further implementation, when a rubber string is used as the at least one elastic towing rope, as a combination, at least one rubber string, at least one coil compression spring, or at least one coil extension spring can be used as the return elastic component.

In conclusion, the prior art did not use the dependent transmission technique of a pulley assembly in the nail gun. The prior art even did not use an elastic rubber string as the towing rope to move the movable pulley. According to the above descriptions of the present invention, the present invention uses a fixed pulley and a movable pulley to guide the towing rope, so that there is dependent transmission between the movable pulley and the nailing rod. Under the condition that the nailing stroke is not affected, such a configuration can effectively reduce the action distance of the return elastic component to store an elastic potential energy. Therefore, the present invention can eliminate or alleviate the problem of impact brittleness and elastic fatigue of the return elastic component. Meanwhile, it can also avoid damage of the cable under the pulling force of the nailing rod during nailing actions. Furthermore, the present invention can enhance the resistance to fatigue and durability of the return elastic component and the towing rope.

The above disclosed implementation and technical effect are detailed through the following drawings and descriptions of embodiments.

DETAILED DESCRIPTION OF THE INVENTION

Figure 1:
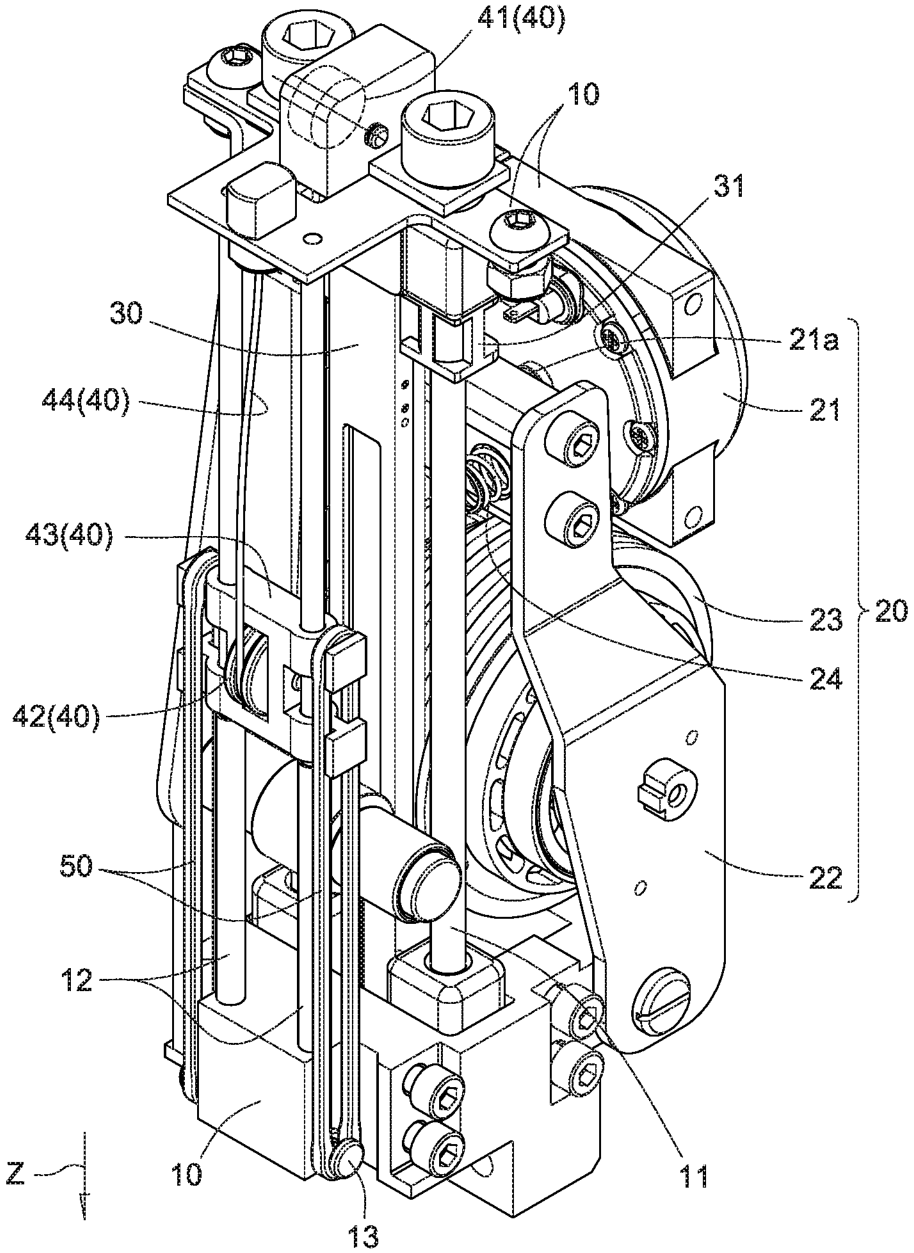
FIG. 1 is a perspective view of the first embodiment of the present invention.
Figure 2:
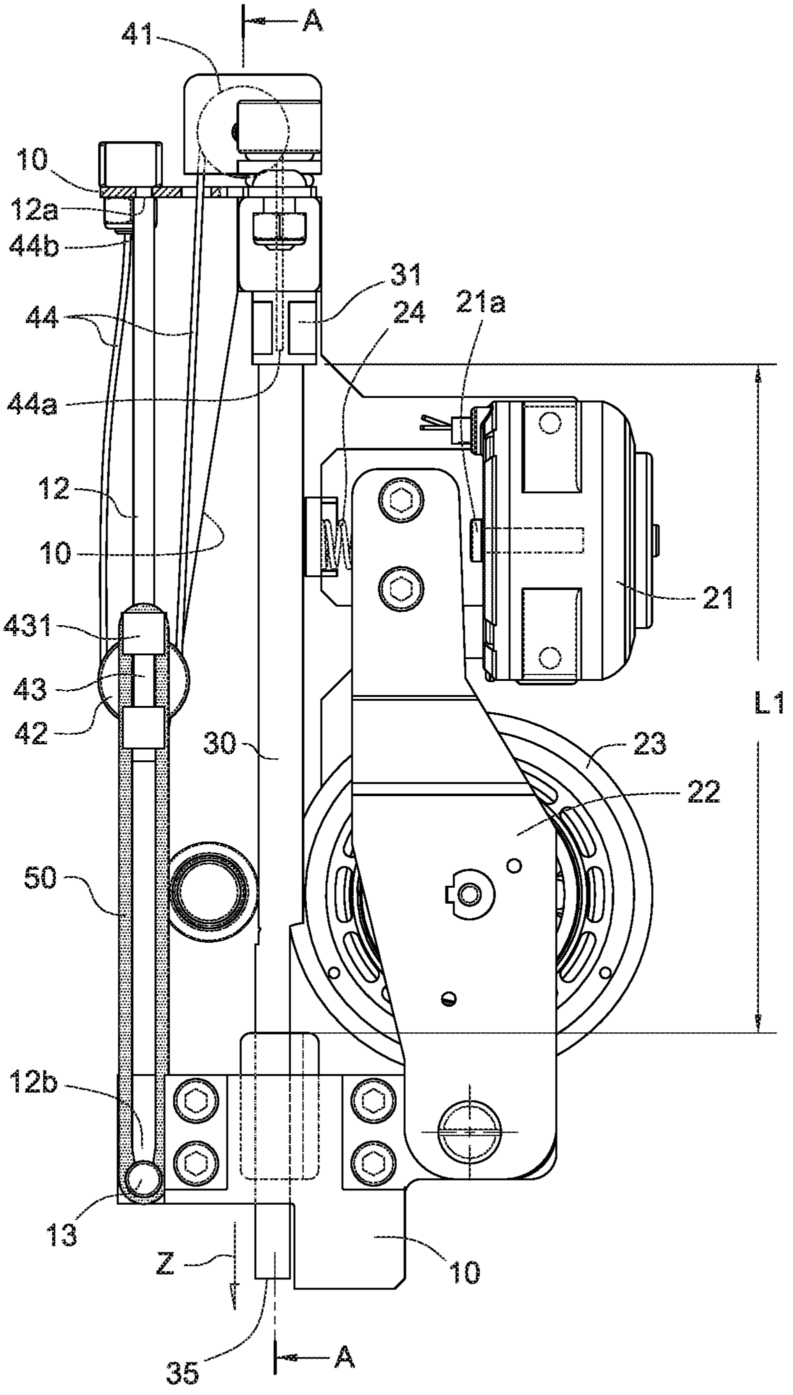
FIG. 2 is a front view of FIG. 1.
Figure 5:
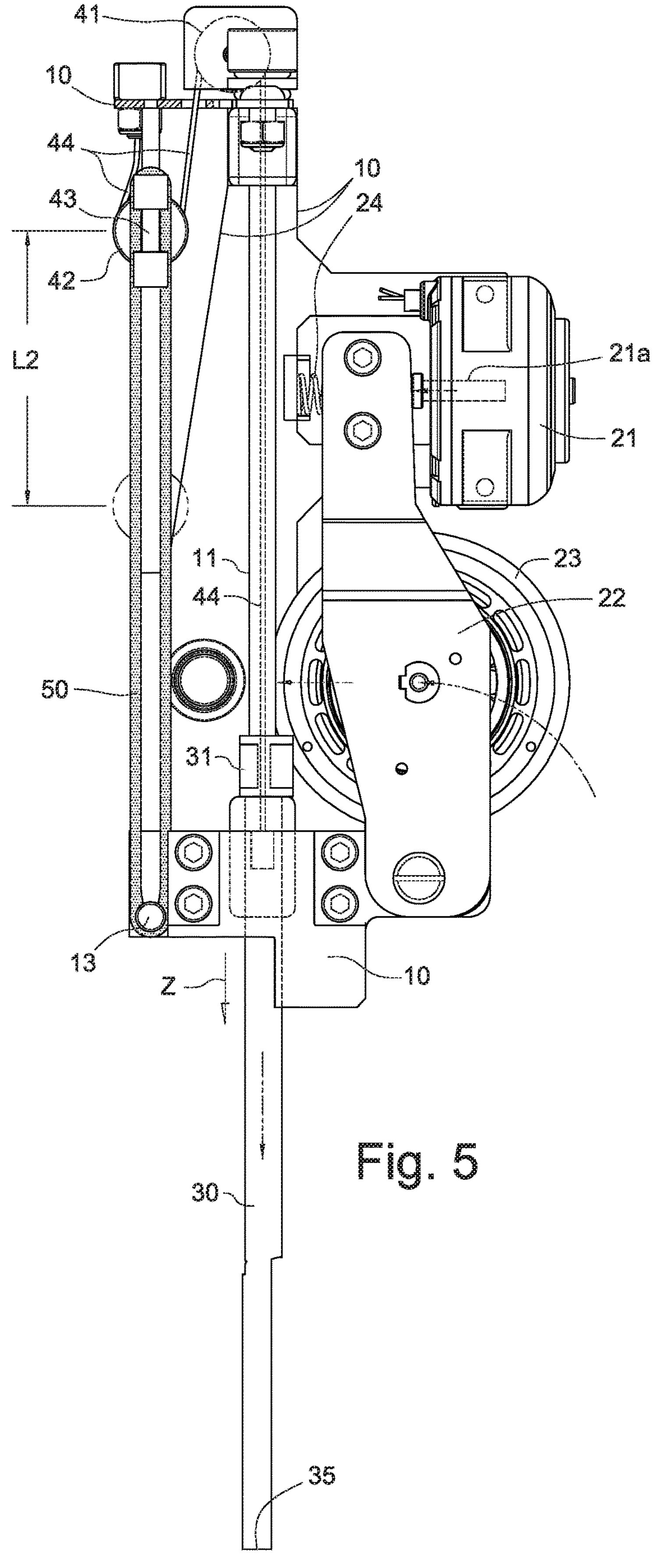
FIG. 5 is an action view when the nailing rod is driven to move downward to shoot the nail under the state of FIG. 2.

Referring collectively to FIG. 1 through FIG. 5, the detailed configuration of the first preferred embodiment of the present invention is disclosed. As shown, the present invention discloses a nailing rod return transmission applied in an electric nail gun, configured on a gun body frame 10 of an electric nail gun, comprising a motor driving unit 20, a nailing rod 30, a pulley assembly 40, and at least one return elastic component 50, and having the following features:

As shown in FIGS. 1 and 2, the motor driving unit 20 comprises an electromagnetic driver 21 fixed on the top end of the gun body frame 10, and a swing arm 22 pivoted at a position near the bottom end of the gun body frame 10. The swing arm 22 is configured with a power flywheel 23. The power flywheel 23 is made of a motor and a flywheel in transmission connection, so that the power flywheel 23 can have rotational kinetic energy. Specifically, the motor can be an inner rotor motor or an outer rotor motor. Transmission connection means one side of the flywheel is axially connected to the inner rotor motor, or a leather strap is wound between the flywheel and the inner rotor motor, or the flywheel is axially connected on the periphery of the outer rotor motor. In addition, the electromagnetic driver 21 is activated by an electromagnetic coil to generate a magnetic field to push a push rod 21*a*, so that the swing arm 22 is driven to swing. A compression spring 24 is configured between the swing arm 22 and the gun body frame 10. Based on such a configuration, when the electromagnetic driver 21 is electrified and magnetized to drive the push rod 21*a* to push the swing arm 22 to swing, the swing arm 22 can drive the power flywheel 23, and through friction, the wheel surface can drive the nailing rod 30 to move downward to shoot the nail (as shown in FIG. 5 to be described later). During the process, the compression spring 24 is compressed to store an elastic pushing force. When the electromagnetic driver 21 is powered off, the swing arm 22 is released. Under the elastic pushing force of the compression spring 24, the swing arm 22 will be pushed to swing back to its original position, and the wheel surface of the power flywheel 23 is separated from the nailing rod 30.

Figure 3:
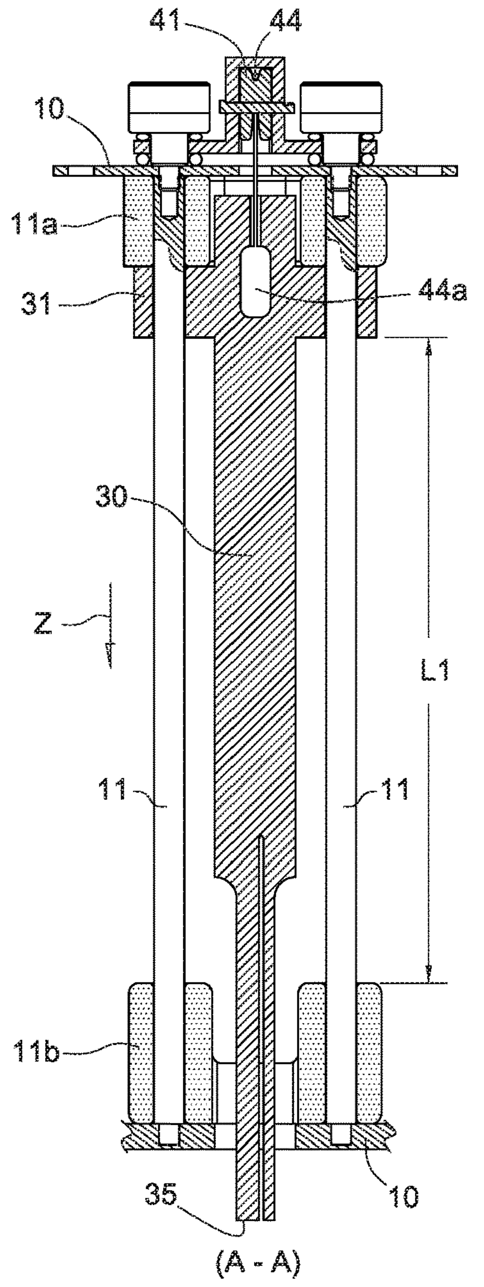
FIG. 3 is a sectional view of FIG. 2 along A-A section.

As disclosed in FIG. 3, the gun body frame 10 is configured with at least one guide column in the nailing axial direction Z. As an example, the present embodiment uses a pair of first guide columns 11 for description. The two ends of the pair of first guide columns 11 are respectively configured with a pair of upper cushion pads 11*a* and a pair of lower cushion pads 11*b*, and between the pair of upper cushion pads 11*a* and the pair of lower cushion pads 11*b*, a nailing stroke L1 in the nailing axial direction Z is defined. The two ends of the top of the nailing rod 30 are respectively extended to form a pair of slide seats 31, so that the pair of slide seats 31 can be symmetrically fitted on the pair of first guide columns 11 in a slidable manner and positioned between the pair of upper cushion pads 11*a* and the pair of lower cushion pads 11*b*. The nailing rod 30 is fitted inside the gun body frame 10 in the nailing axial direction Z through the slidable configuration of the slide seat 31 and the first guide column 11, so that, when the nailing rod 30 is driven by the motor driving unit 20, it will move downward along the nailing stroke L1 to shoot the nail in the nailing axial direction Z (as shown in FIG. 5, the direction of the arrow marked in the nailing axial direction Z is to move downward to shoot the nail). Meanwhile, the lower cushion pad 11*b* limits the pair of slide seats 31 to move downward till the lower dead point to shoot the nail, and the upper cushion pad 11*a* limits the pair of slide seats 31 to move upward till the upper dead point to reset.

In the embodiment shown in FIG. 1 and FIG. 2, the pulley assembly 40 comprises a fixed pulley 41, a movable pulley 42, a guiding holder 43, and a towing rope 44. Specifically, the fixed pulley 41 and the movable pulley 42 can be configured symmetrically in pluralities and are all rope wheels that can rotate freely. The difference is that, the fixed pulley 41 is positioned on the gun body frame 10, the movable pulley 42 is pivoted inside the guiding holder 43, so that the movable pulley 42 is configured beside the nailing rod 30 in the nailing axial direction Z in a movable manner, whereas the fixed pulley 41 is configured on the gun body frame 10 above the nailing rod 30 in the nailing axial direction Z. In other words, as disclosed in FIG. 2 and FIG. 5, the nailing rod 30 has a striking part 35, and either before nailing (as shown in FIG. 2) or after nailing (as shown in FIG. 5), the movable pulley 42 can always be positioned between the fixed pulley 41 and the striking part 35 in the nailing axial direction Z.

The guiding holder 43 can carry the movable pulley 42 and be configured in a movable manner in the nailing axial direction Z. When the guiding holder 43 is configured in the nailing axial direction Z in a movable manner, through the at least one guide column symmetrically configured on the gun body frame 10 in the nailing axial direction Z, the at least one guide column can be marked by the second pair of guide columns 12 in FIG. 1, FIG. 2 and FIG. 4, so as to be differentiated from the aforesaid first guide column 11 for the nailing rod 30 to be configured in a slidable manner. The guiding holder 43 is slidably configured on the second pair of guide columns 12, capable of moving in the nailing axial direction Z, so as to execute movement within an action stroke L2 (as disclosed in FIG. 5, to be detailed later). In the present embodiment, a conventional non-elastic steel cable (also called steel rope) is used as the towing rope 44, and the towing rope 44 has a head end 44*a* and a tail end 44*b* to define a specific length. The head end 44*a* can be fixed on the nailing rod 30 through embedding or locking, and the tail end 44*b* can also be fixed on the top of the gun body frame 10 through embedding or locking. The fixed pulley 41 is positioned between the head end 44*a* and the guiding holder 43 to guide the towing rope 44, whereas the movable pulley 42 is positioned between the fixed pulley 41 and the tail end 44*b* to guide the towing rope 44.

Figure 4:
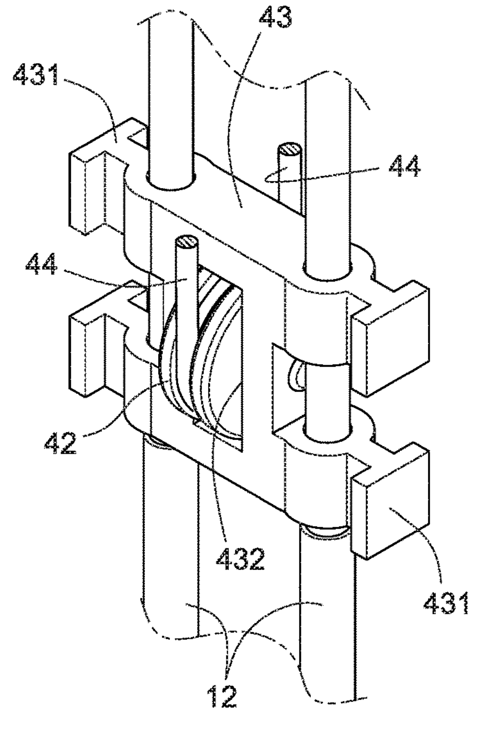
FIG. 4 is perspective configuration view or enlarged view of the guiding holder and movable pulley shown in FIG. 1 and FIG. 2.

Furthermore, as disclosed in FIG. 4, the guiding holder 43 can actually be made in the form of a slide seat, and the middle section of the guiding holder 43 can be configured with a through-hole 432, so that the movable pulley 42 can be pivoted inside the through-hole 432 through a pivot shaft and be exposed outside, and can be wound by the towing rope 44 in a freely rotatable manner, so that the guiding holder 43 and the towing rope 44 guide each other. In addition, the two ends of the guiding holder 43 can also be extended to form at least one pair of hook ears 431 symmetrically arranged on the left and right sides, and the gun body frame 10 can be correspondingly formed with a pair of hook buttons 13 (marked in FIGS. 1 and 2) symmetrically arranged on the left and right sides at a position near the bottom end by following the action stroke L2 shown in FIG. 5.

In the embodiment shown in FIGS. 1 to 5, the at least one return elastic component 50 is made of a pair of rubber strings that can be elastically extended or compressed, and the pair of return elastic components 50 can be symmetrically configured between the hook ear 431 of the guiding holder 43 and the hook button 13 of the gun body frame 10 at a position near the bottom end (as shown in FIG. 2), i.e., the pair of return elastic components 50 can be symmetrically positioned between the gun body frame 10 and the guiding holder 43 (as shown in FIGS. 1 and 2) through the hook ear 431 and the hook button 13, to drive the guiding holder 43 configured on the second pair of guide columns 12 on a movable or slidable manner to move the action stroke L2 (as shown in FIG. 5, to be detailed later). In other words, as shown in FIG. 2, the second pair of guide columns 12 respectively have a top end 12*a* and a bottom end 12*b* that can be fixed with the gun body frame 10, and the pair of return elastic components 50 are symmetrically configured between the guiding holder 43 and the bottom end 12*b*.

Referring to FIGS. 2 and 5, FIG. 2 shows the states before the nailing rod 30 moves downward to shoot the nail and after it moves upward along the nailing stroke L1 to reset, and FIG. 5 shows the state when the nailing rod 30 moves downward along the nailing stroke L1 to shoot the nail. When the nailing rod 30 moves downward along the nailing stroke L1 to shoot the nail shown in FIG. 2 until the state shown in FIG. 5, the towing rope 44 tows the movable pulley 42 and drives the guiding holder 43, so that the guiding holder 43 can move the action stroke L2 shown in FIG. 5 in a way to store the elastic potential energy of the pair of return elastic components 50. After the nailing rod 30 moves downward to shoot the nail, as shown in FIG. 5, the pair of return elastic components 50 will drive the guiding holder to move along the action stroke L2 back to its original position in a way to release the elastic potential energy 43, and through the movable pulley 42, the guiding holder 43 tows the towing rope 44 to drive the nailing rod 30 to move upward along the nailing stroke to reset L1. The action stroke L2 is greater than 0 and less than the nailing stroke L1. Furthermore, although the towing rope 44 is a non-elastic cable, the movable pulley 42 and the nailing rod 30 are configured with the feature of dependent transmission, so that the action stroke L2 is only (or equal to) half of the nailing stroke L1. Such a design can effectively reduce the travel distance of the pair of return elastic components 50 under the force of the nailing rod 30 moving downward to shoot the nail (i.e., the action stroke L2 is reduced).

On the other hand, in the embodiment shown in FIGS. 1 to 5, the towing rope 44 can be made of a hyperelastic material that can be deformed to store potential energy. The hyperelastic material can be an elastomer or rubber. Specifically, in the present embodiment, an elastic rubber string is used as the towing rope 44, so that the towing rope 44 becomes an elastic towing rope. In addition, in the present embodiment, the return elastic component 50 made of a rubber string can also be defined as the hyperelastomer.

Moreover, as the aforesaid rubber string is made of a hyperelastomer or elastomer (hereinafter elastomer is used as a representative for description) made of elastic rubber, the action behaviors of both the elastic towing rope (indicated by component number 44) and the return elastic component 50 meet the plastic deformation theory described in Strain Life Method. Under this condition, the deformation (also called displacement) of the elastomer under a force is particularly important. From Eq. (1):

$$\varepsilon = \frac{\Delta L}{L^0} \qquad \text{Eq. (1)}$$

the strain capacity (ε) of the elastomer is defined as the deformation of the elastomer (also called displacement, ΔL) divided by the original length of the elastomer ($L_0$). This relation shows how displacement is transformed to strain capacity, and indicates the degree of deformation of the elastomer.

Furthermore, the fatigue behavior of the rubber string is described by a simplified Coffin-Manson equation, to study the influence of plastic deformation upon the fatigue life, as shown in Eq. (2):

$$\varepsilon_{pl} = \varepsilon'_f \cdot (2N_f)^b \qquad \text{Eq. (2)}$$

In Eq. (2), $\varepsilon_{pl}$ indicates degree of plastic deformation of the elastomer, $\varepsilon'_f$ is the coefficient of the fatigue strain capacity of the elastomer, which is the number of cycles reached till fatigue damage of the elastomer (i.e., fatigue life), whereas b is fatigue index (being a material constant) of the plastic deformation of the elastomer.

As the present invention reduces the action stroke L2 (i.e., displacement ΔL) of the rubber string under the force of the nailing rod 30 when moving downward to shoot the nail, it will certainly reduce the degree of plastic deformation of the rubber string (also called elastomer or return elastic component 50). Thus, the resistance to fatigue and durability of the return elastic component 50 during repeated nailing can be substantially enhanced. Moreover, the present invention can also solve the problem of impact brittleness of conventional coil extension springs.

When a towing rope 44 is used to replace the conventional steel cable to tow the movable pulley, the action stroke L2 can be further less than half of the nailing stroke L1 (see the third embodiment described later). Thus, the resistance to fatigue and durability of the return elastic component 50 can be further enhanced.

Figure 6:
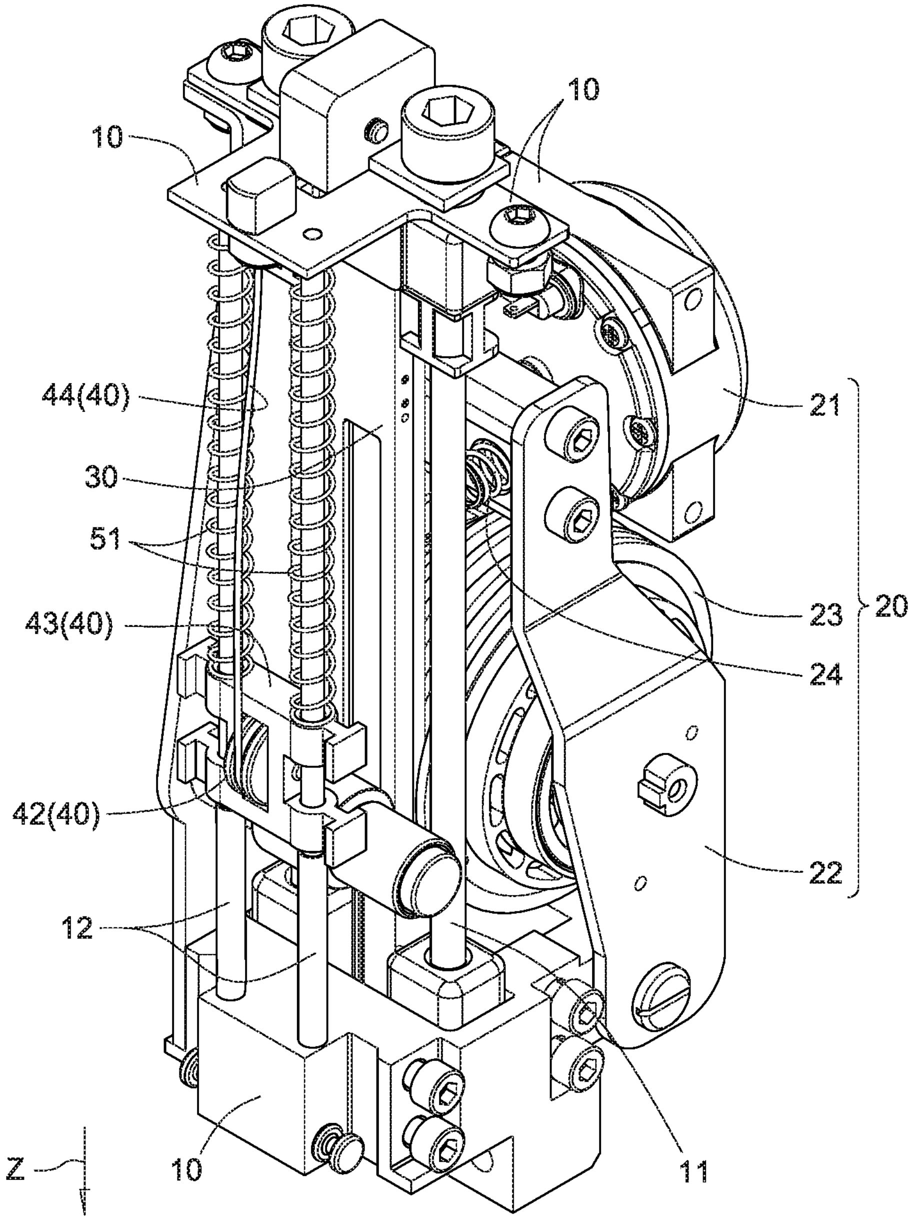
FIG. 6 is a perspective view of the second embodiment of the present invention.
Figure 7:
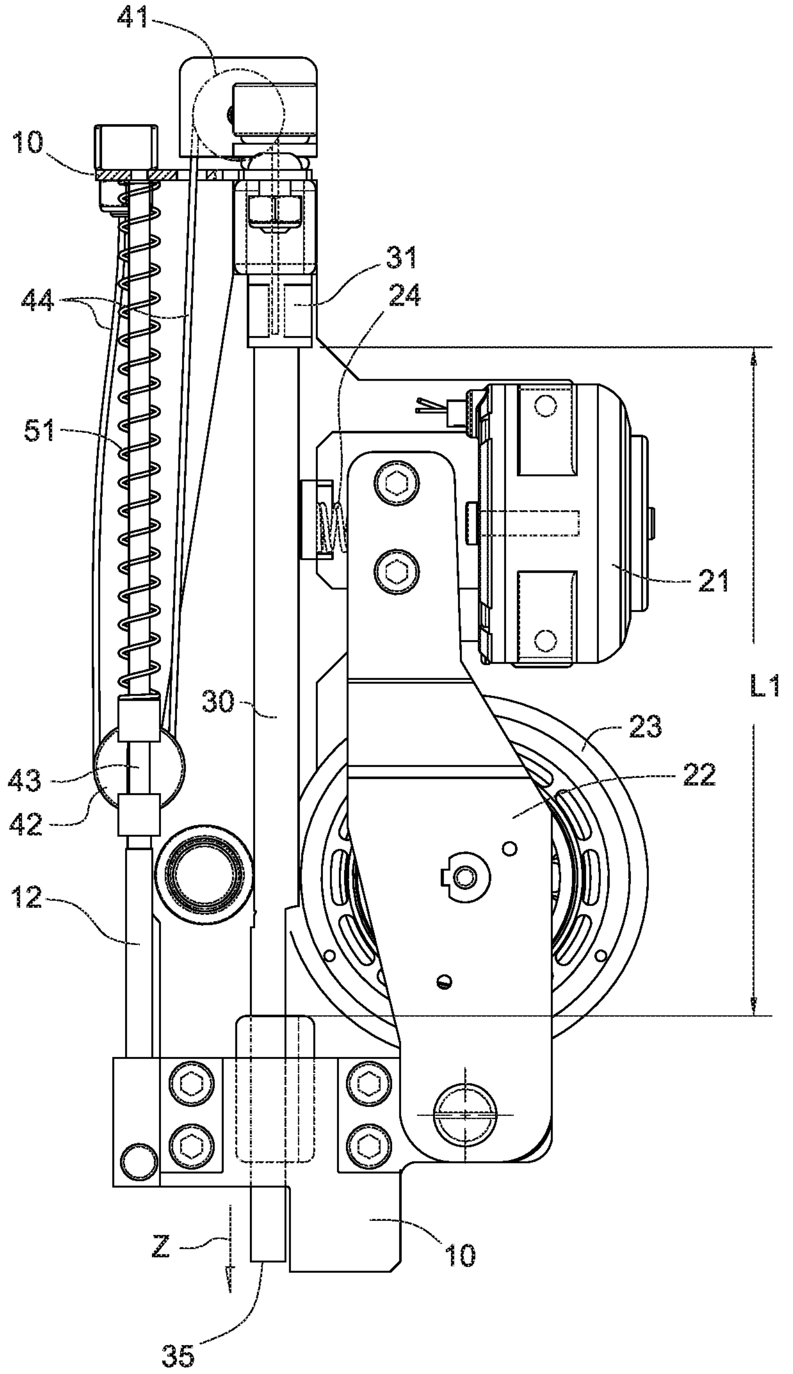
FIG. 7 is a front view of FIG. 6.
Figure 8:
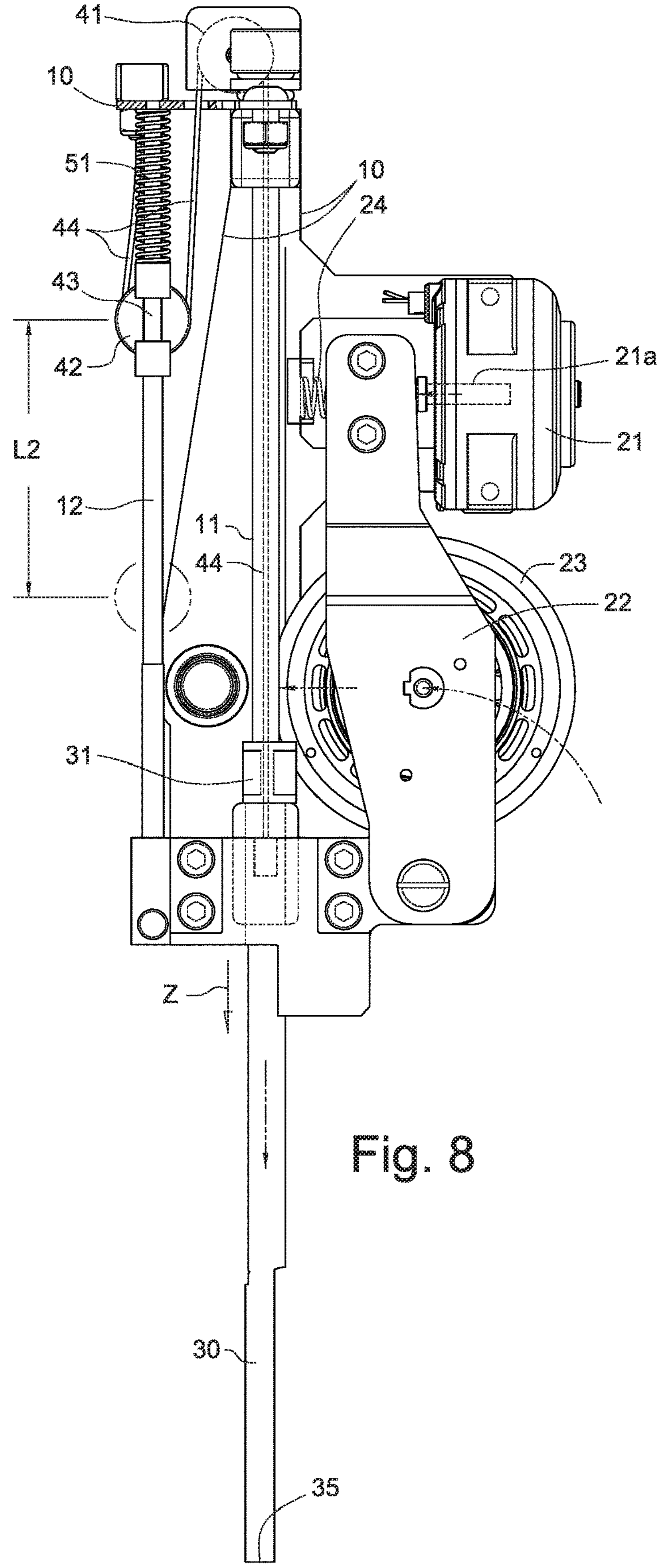
FIG. 8 is an action view when the nailing rod is driven to move downward to shoot the nail under the state of FIG. 7.

Referring collectively to FIGS. 6 to 8, which disclose the configuration details of the second embodiment of the present invention. It differs from the first embodiment shown in FIGS. 1 to 5 in that, the second embodiment uses a pair of coil extension springs (the first embodiment uses coil compression springs) as the return elastic component 51, and the pair of return elastic components 51 made of coil extension springs are symmetrically configured outside the second guide column 12 positioned between the top end 12*a* of the second pair of guide columns 12 and the top wall of the guiding holder 43 (as shown in FIGS. 6 and 7). Other details are the same as the first embodiment, and the same dependent transmission is produced to reduce the action stroke L2 of the guiding holder 43. Furthermore, in the second embodiment, when the nailing rod 30 moves downward to shoot the nail (as shown in FIG. 8), the towing rope 44 tows the movable pulley 42 and the guiding holder 43 to move upward along the action stroke L2, so that the pair of return elastic components 51 made of coil extension springs are compressed to firstly store elastic potential energy and then release elastic potential energy, thus driving the guiding holder 43 to move upward along the action stroke L2 to reset (as shown in FIG. 7). During the process, the action stroke L2 of the pair of return elastic components 51 can also be greater than 0 and less than the nailing stroke L1, or, when a cable is used as the towing rope 44, the action stroke L2 can be equal to half of the nailing stroke L1. Therefore, the pair of return elastic components 51 can also reduce the distance when pulled by the nailing rod 30 moving downward to shoot the nail (i.e., reduce the action stroke L2), and consequently reduce the likeliness of impact or collision between each of the spiral rings of the return elastic components 51 made of coil extension springs, so as to substantially reduce the impact brittleness of the coil extension springs.

In addition, in the above second embodiment, the configuration of the return elastic component 51 is described using a coil compression spring as an example. When the return elastic component 51 is a pair of coil extension springs, the pair of coil extension spring can be configured between the guiding holder 43 and the bottom end 12*b* of the second pair of guide columns 12, just as the return elastic component 50 in the first embodiment. It has an equivalent effect. It is to be understood that such an alteration in technical application is an easy variation of the present invention and shall be covered by the scope of the patent application.

Furthermore, in the above second embodiment, when a rubber string is used as the towing rope 44, the towing rope 44 can also be configured in a way that the action stroke L2 is less than half of the nailing stroke L1 (see the third embodiment described later). Thus, the resistance to fatigue and durability of the return elastic component 51 can be further enhanced.

Figure 9:
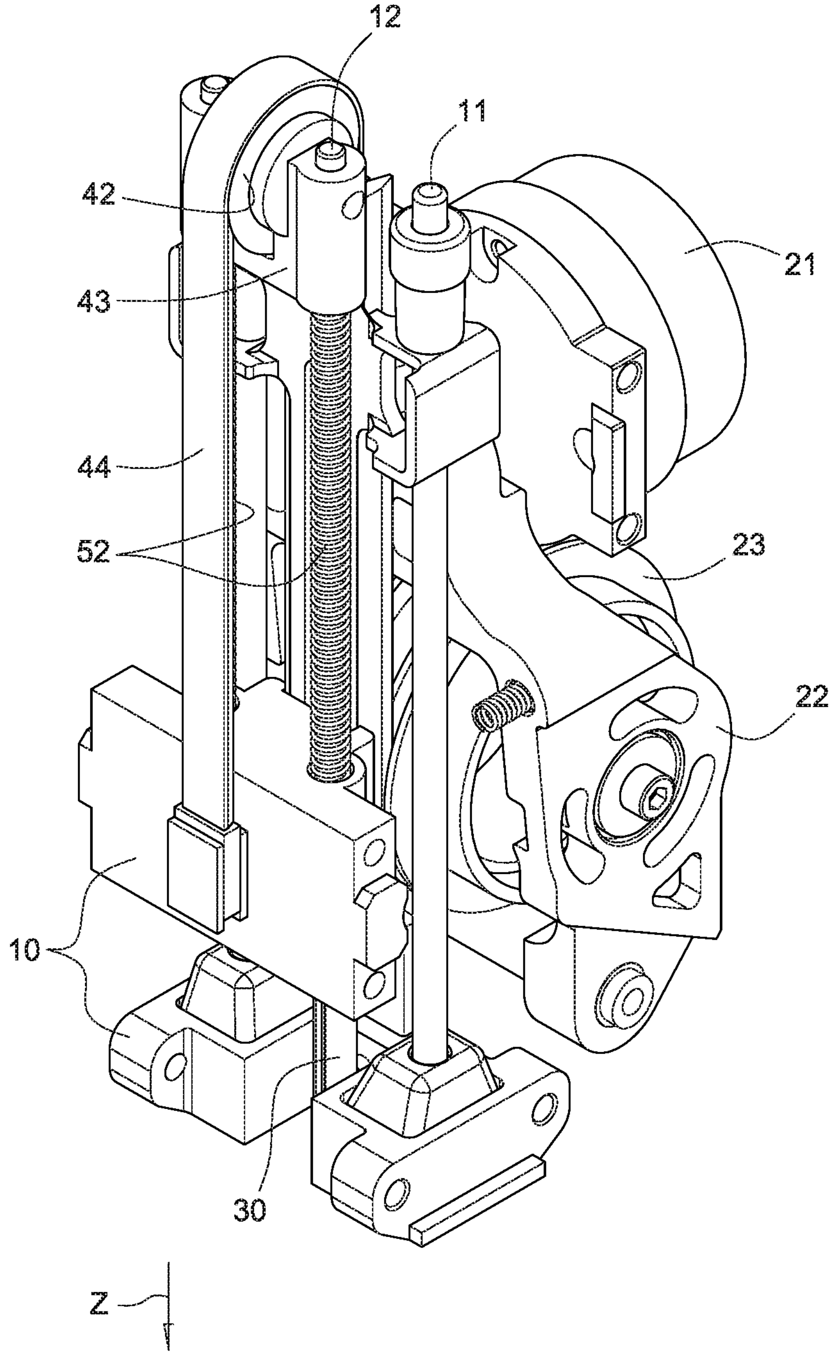
FIG. 9 is a perspective view of the third embodiment of the present invention.
Figure 10:
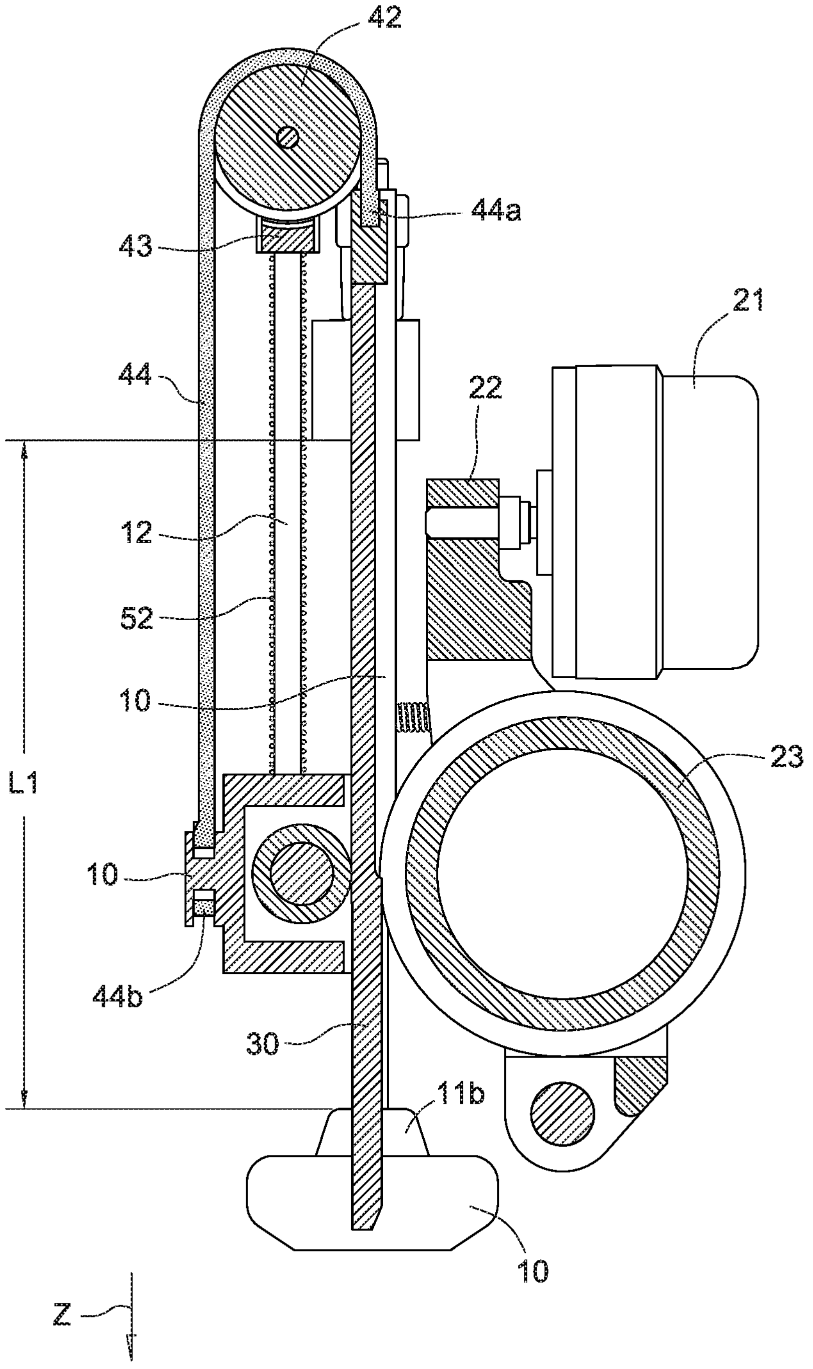
FIG. 10 is a front sectional view of FIG. 9.
Figure 11:
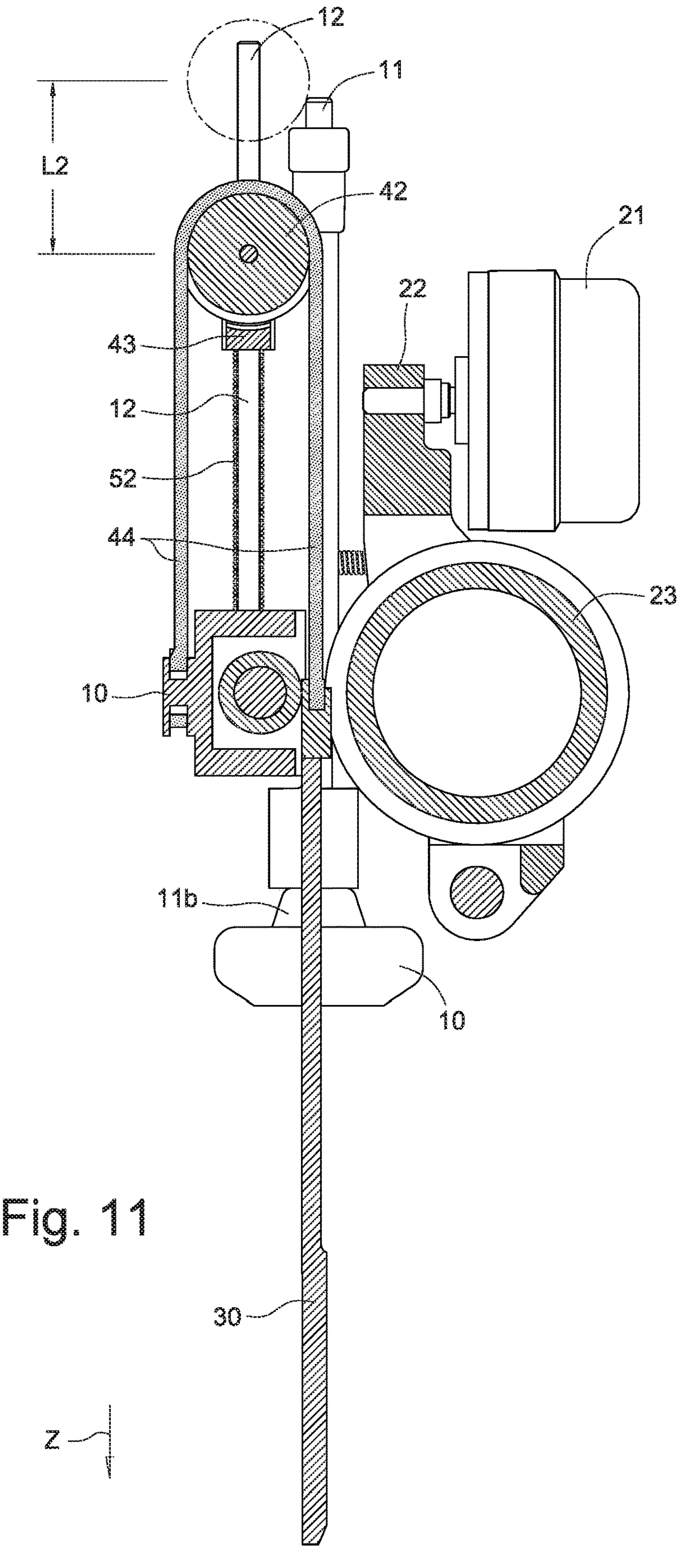
FIG. 11 is an action view when the nailing rod is driven to move downward to shoot the nail under the state of FIG. 10.

Referring collectively to FIGS. 9 to 11, the configuration details of the third embodiment of the present invention differ from the above first and second embodiments only in that: the fixed pulley 41 shown in FIGS. 1 to 8 is abandoned, so that the pulley assembly 40 only comprises the movable pulley 42, the guiding holder 43, and the towing rope 44.

More specifically, as disclosed in FIG. 9, the guiding holder 43 made in the form of a slide seat is slidably configured on the second guide column 12 of the gun body frame 10, capable of moving in the nailing axial direction Z.

FIG. 10 discloses the movable pulley 42 pivoted on the guiding holder 43 and the towing rope 44 guided by the movable pulley 42. The head end 44*a* of the towing rope 44 is fixed on the nailing rod 30 and the tail end 44*b* is fixed on the gun body frame 10. The pair of return elastic components 52 made of coil extension springs can be guided by the second guide column 12 and be configured between the bottom end of the gun body frame 10 and bottom part of the guiding holder 43 to drive the guiding holder 43 to move back and forth in the nailing axial direction Z. As disclosed in FIG. 11, when the nailing rod 30 moves downward to shoot the nail, through the towing rope 44, the nailing rod 30 will tow the movable pulley 42 and the guiding holder 43 to move downward the action stroke L2, so as to compress the pair of return elastic components 52. Thus, by releasing the elastic force, the pair of return elastic components 52 can drive the guiding holder 43 to move upward along the action stroke L2 back to the state shown in FIG. 10. During this process, the action stroke L2 of the return elastic components 52 can also be greater than 0 and less than the nailing stroke L1, or, the action stroke L2 can be half of the nailing stroke L1. Therefore, the pair of return elastic components 52 can also effectively reduce the travel distance of the movable pulley 42 and the guiding holder 43 under the pulling force of the nailing rod 30 moving downward to shoot the nail (i.e., reduce the action stroke L2). Other details are the same as the first and second embodiments disclosed above, and the function is equivalent.

Using the structural configuration of the above third embodiment, the present invention further discloses that, when adopting a rubber string with its elastic coefficient equal to or larger than the return elastic components 52 as the towing rope 44, the elastic force generated by the towing rope 44 can be greater than or equal to the return elastic components 52, and the total elastic force generated by the towing rope 44 and the return elastic components 52 will be far less than the force of the flywheel 23 driving the nailing rod 30 to move downward to shoot the nail. Under this condition, based on the above-mentioned dependent transmission technique and Hooke's Law, with the configuration of the towing rope 44 in the present invention, the action stroke L2 can be less than half of the nailing stroke L1.

More specifically, as disclosed in FIG. 10, before nailing, due to the elasticity of the towing rope 44 made of rubber string, a preset pulling force is already provided to tow the nailing rod 30. The preset pulling force of the towing rope 44 (also called rubber string) is equal to the pressing force preset during configuration of the return elastic component 52. The movable pulley 42 and guiding holder 43 is still not towed to move by the towing rope 44 (also called rubber string). Then, when the nailing rod 30 moves downward to shoot the nail as shown in FIGS. 9 and 10, the force of the power flywheel 23 to drive the nailing rod 30 to move downward to shoot the nail will firstly absorb the preset pulling force of the towing rope 44 (also called rubber string) and the preset pressing force of the return elastic component 52. Then, along the movement of nailing rod 30 downward to shoot the nail, the length of the towing rope 44 (also called rubber string) is will be extended. The extension of the towing rope 44 (also called rubber string) will offset the compression of the return elastic component 52 pushed by the movable pulley 42 and the guiding holder 43. Therefore, the action stroke L2 of the return elastic component 52 can be less than half of the nailing stroke L1, and the resistance to fatigue and durability of the return elastic component 50 can be further enhanced.

In addition, as shown in FIG. 11, once the nailing rod 30 has completed the movement downward to shoot the nail, the slide seat 31 will strike the lower cushion pad 11*b* configured on the bottom end of the gun body frame 10, so that the lower cushion pad 11*b* will be slightly compressed in the nailing axial direction Z, and the slide seat 31 and nailing rod 30 will transmit a pulling force to the towing rope 44 (also called rubber string). Due to the elasticity of the towing rope 44 (also called rubber string) itself, it will absorb the pulling force, thus avoiding damage after long-term operation.

Furthermore, based on the configuration feature of the movable pulley 42 with dependent transmission, and the configuration feature of the towing rope 44 (also called rubber string) with preset pulling force to tow the nailing rod 30, after the nailing rod 30 moves downward to shoot the nail, the force released by the elastic potential energy stored by the return elastic component 50 must be greater than 2 times of the elastic force of the towing rope 44 (also called rubber string), to ensure that the pair of return elastic components 50 can drive the nailing rod 30 to move upward to reset.

Figure 12:
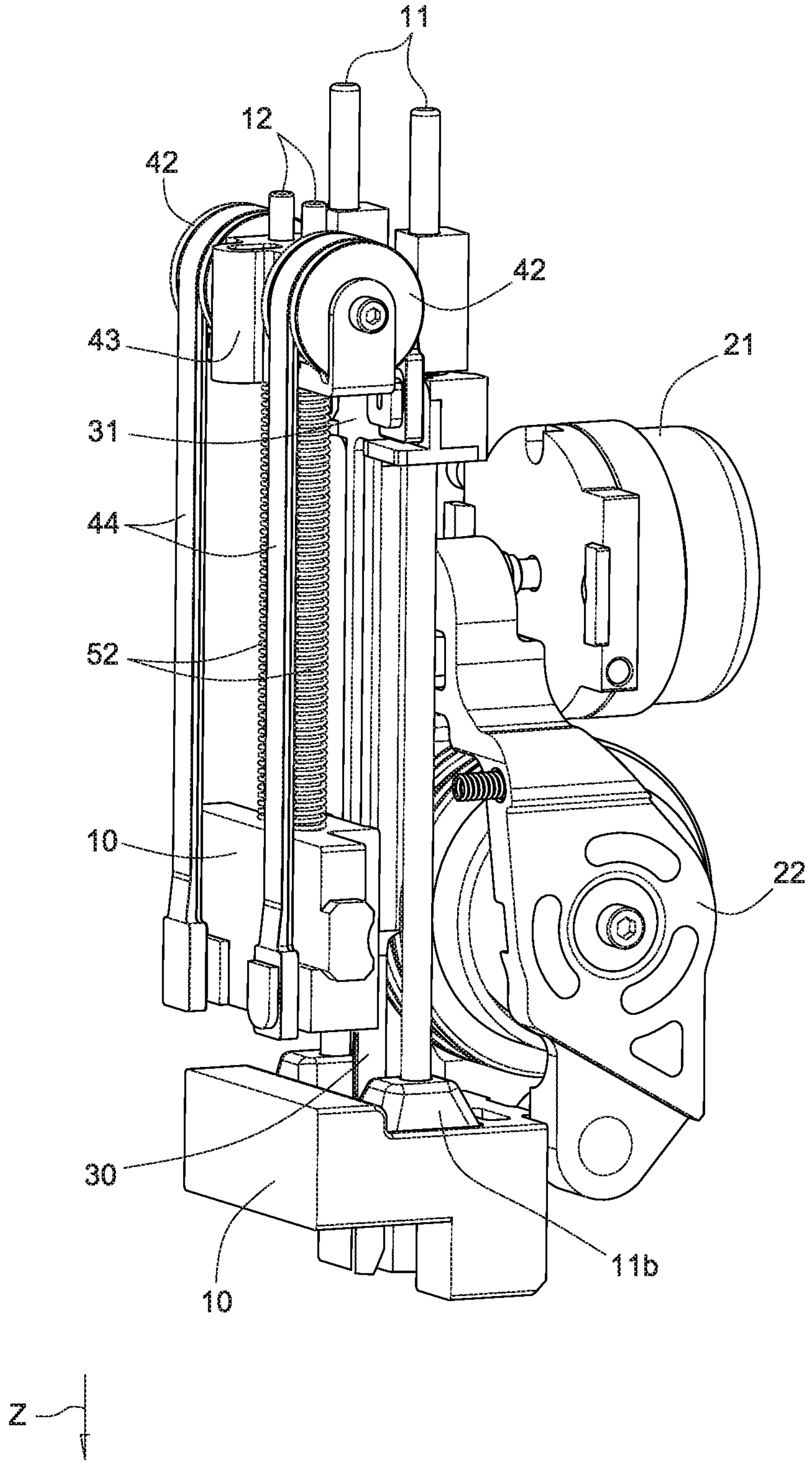
FIG. 12 is a perspective view the fourth embodiment of the present invention.

Referring to FIG. 12, the configuration structure of the fourth embodiment of the present invention is disclosed. It differs from the third embodiment in that: the guiding holder 43 is pivoted with a pair of movable pulleys 42 to respectively guide a towing rope 44. In addition, both the structural configuration and the nailing action mode of the fourth embodiment are the same as the third embodiment.

It is to be noted that, in the fourth embodiment shown in FIG. 12, a pair of movable pulleys 42 guides a pair of towing ropes 44, once the nailing rod 30 completes the movement downward to shoot the nail and causes the slide seat 31 to strike the lower cushion pad 11*b*, the pulling force transmitted from the slide seat 31 and nailing rod 30 to the towing rope 44 can be further dispersed. Therefore, comparing to the third embodiment, the fourth embodiment can further reinforce the resistance to fatigue and durability of the towing rope 44 made of cable or rubber string.

In addition, both the above third and fourth embodiments abandon the structural configuration of the fixed pulley 41 in the first and second embodiments. If the fixed pulley 41 of the first and second embodiments is introduced into the third and fourth embodiments, with the number configured to correspond to the movable pulley 42 and the towing rope 44, such a configuration is an easy variation and shall be covered by the technical scope of the present invention.

Furthermore, from the descriptions of the above-mentioned first to fourth embodiments, we can know that the number of the movable pulley 42 and towing rope 44 can be configured to be one single or a pair, and the return elastic component 50 can be made of rubber string or coil extension spring (including coil compression spring and coil extension spring). Either configurations can accomplish the purpose of reducing the action distance of the return elastic component to store an elastic potential energy, so as to enhance the resistance to fatigue and durability of the return elastic component and the towing rope. Therefore, it is to be understood that any equivalent alteration based on the aforesaid embodiments to realize similar functions shall be construed as technique covered by the scope of the present invention.

The above embodiments are only used to describe preferred implementation of the present invention, and are not intending to limit the scope of patent application of the present invention. Therefore, the present invention shall be construed based on the contents of claims defined in the patent application.

The invention claimed is:

1. A return transmission of nailing rod for electric nail gun, configured on a gun body frame and comprising:

a motor driving unit;

a nailing rod, fixed inside the gun body frame along a nailing axial direction in a slidable manner, the nailing rod being driven by the motor driving unit to move downward along a nailing stroke in the nailing axial direction to shoot a nail;

a pulley assembly, comprising at least one movable pulley, a guiding holder and at least one towing rope, wherein, the at least one movable pulley is pivoted inside the guiding holder in a freely rotatable manner, the guiding holder carries the at least one movable pulley and can move in the nailing axial direction, the at least one towing rope has a head end and a tail end forming a specific length in between, the head end is fixed on the nailing rod, the tail end is fixed on the gun body frame, the at least one movable pulley is positioned between the head end and the tail end to guide the at least one towing rope;

at least one return elastic component, configured between the gun body frame and the guiding holder, and having elastic potential energy to drive the guiding holder configured in a movable manner;

specifically, when the nailing rod moves downward along the nailing stroke to shoot the nail, the at least one towing rope tows the at least one movable pulley and drives the guiding holder, so that the guiding holder can move an action stroke in a way to store the elastic potential energy of the at least one return elastic component, after the nailing rod moves downward to shoot the nail, the at least one return elastic component will drive the guiding holder in a way to release the elastic potential energy, so as to move the guiding holder by following the action stroke back to an original position of the guiding holder, meanwhile, through the at least one movable pulley, the guiding holder tows the at least one towing rope, so as to drive the nailing rod to move upward along the nailing stroke back to an original position of the nailing rod, and a distance of the action stroke is greater than 0 and less than a distance of the nailing stroke.

2. The return transmission of the nailing rod for the electric nail gun defined in claim 1, wherein the at least one towing rope is a cable, and the distance of the action stroke is greater than 0 and equal to half of the distance of the nailing stroke.

3. The return transmission of the nailing rod for the electric nail gun defined in claim 1, wherein the at least one towing rope is a rubber string having elasticity, and the at least one return elastic component is a rubber string, a coil compression spring, or a coil extension spring, and the distance of the action stroke is greater than 0 and less than half of the distance of the nailing stroke.

4. The return transmission of the nailing rod for the electric nail gun defined in claim 1, wherein the at least one movable pulley is configured in a pair of movable pulleys pivoted on the guiding holder, and the at least one towing rope is also in a pair and is guided by the pair of movable pulleys.

5. The return transmission of the nailing rod for the electric nail gun defined in claim 1, wherein the pulley assembly also comprises at least one fixed pulley fixed on the gun body frame in a freely rotatable manner, and the at least one fixed pulley is positioned between the head end and the guiding holder to guide the at least one towing rope.

6. The return transmission of the nailing rod for the electric nail gun defined in claim 5, wherein the at least one movable pulley is configured beside the nailing rod in the nailing axial direction in a movable manner, the nailing rod has a striking part, and the at least one movable pulley is positioned between the at least one fixed pulley and the striking part in the nailing axial direction.

7. The return transmission of the nailing rod for the electric nail gun defined in claim 1, wherein the at least one fixed pulley is positioned on the gun body frame above the nailing rod in the nailing axial direction.

8. The return transmission of the nailing rod for the electric nail gun defined in claim 7, wherein the at least one fixed pulley is configured in a pair of fixed pulleys positioned on the gun body frame in a freely rotatable manner, and the at least one movable pulley is configured in a pair of movable pulleys pivoted on the guiding holder, and the at least one towing rope is also in a pair to be guided by the pair of fixed pulleys and the pair of movable pulleys.

9. The return transmission of the nailing rod for the electric nail gun defined in claim 1, wherein the gun body frame is also configured with at least one guide column in the nailing axial direction, and the guiding holder is configured on the at least one guide column in a slidable manner for movement within the action stroke.

10. The return transmission of the nailing rod for the electric nail gun defined in claim 9, wherein the at least one guide column is configured in a pair of guide columns, the pair of guide columns respectively having a top end and a bottom end that can be fixed with the gun body frame, the at least one return elastic component is configured in a pair of return elastic components, the pair of return elastic components are symmetrically positioned between the guiding holder and the bottom end.

11. The return transmission of the nailing rod for the electric nail gun defined in claim 9, wherein the at least one guide column is configured in a pair, each guide column respectively having a top end and a bottom end that can be fixed with the gun body frame, the at least one return elastic component is configured in a pair of return elastic components, and the pair of return elastic components are symmetrically positioned between the top end and the guiding holder.

12. The return transmission of the nailing rod for the electric nail gun defined in claim 10, wherein the pair of return elastic components is a pair of rubber strings, a pair of coil compression springs, or a pair of coil extension springs.

13. The return transmission of the nailing rod for the electric nail gun defined in claim 12, wherein the at least one towing rope is in a pair of towing ropes, and the pair of towing ropes is a pair of rubber strings.

14. The return transmission of the nailing rod for the electric nail gun defined in claim 12, wherein the distance of the action stroke is greater than 0 and less than half of the distance of the nailing stroke.

* * * * *